United States Patent
Yaeo et al.

(10) Patent No.: US 11,898,477 B2
(45) Date of Patent: Feb. 13, 2024

(54) CONTROLLER AND CONTROL METHOD FOR INTERNAL COMBUSTION ENGINE

(71) Applicant: TOYOTA JIDOSHA KABUSHIKI KAISHA, Toyota (JP)

(72) Inventors: Toru Yaeo, Anjo (JP); Yoshifumi Matsuda, Toyota (JP); Masashi Hakariya, Nisshin (JP); Atsushi Morikawa, Toyota (JP); Ikuo Hoda, Nagoya (JP); Noriyasu Adachi, Numazu (JP); Masanori Hayashi, Toyota (JP); Kenji Igawa, Shizuoka-ken (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 18/329,708

(22) Filed: Jun. 6, 2023

(65) Prior Publication Data
US 2023/0399971 A1    Dec. 14, 2023

(30) Foreign Application Priority Data
Jun. 10, 2022 (JP) .................. 2022-094245

(51) Int. Cl.
*F01N 11/00* (2006.01)
*F02D 41/02* (2006.01)

(52) U.S. Cl.
CPC ........ *F01N 11/005* (2013.01); *F02D 41/0235* (2013.01)

(58) Field of Classification Search
CPC ...... F01N 11/005; F01N 11/00; F01N 11/002; F01N 9/00; F01N 9/002; F01N 2900/1602; F01N 2900/1404; F01N 2900/0422; F01N 2900/1606; F01N 2550/04; F01N 3/023; F02D 41/0235; F02D 41/1446; F02D 41/029; F02D 41/1441; F02D 41/0275;
(Continued)

(56) References Cited

U.S. PATENT DOCUMENTS 10,145,289 B2 * 12/2018 Kusaka .................. F02F 1/24
2008/0142657 A1 * 6/2008 Ammer .................. B60K 13/04
60/299
(Continued)

FOREIGN PATENT DOCUMENTS

JP    2020-106028 A    7/2020

*Primary Examiner* — Mark A Laurenzi
*Assistant Examiner* — Dapinder Singh
(74) *Attorney, Agent, or Firm* — Finnegan, Henderson, Farabow, Garrett & Dunner, LLP

(57) ABSTRACT

A controller for an internal combustion engine is configured to execute a determination process and an anomaly diagnosing process. The determination process is a process of determining that a deviation between a first change amount and a second change amount during a fuel cutoff operation is less than or equal to a threshold. The anomaly diagnosing process is a process of determining that an exhaust purification device is in a detached state when it is determined in the determination process that the deviation is less than or equal to the threshold. The first change amount and the second change amount are change amounts per unit time of the temperature of exhaust gas on the upstream side and the downstream side of the exhaust purification device, respectively.

7 Claims, 6 Drawing Sheets

(58) Field of Classification Search
CPC ........... F02D 41/024; F02D 2200/0802; F02D 2200/0804; F02D 2200/0812; F02D 2041/0265; Y02T 10/12; Y02T 10/40
See application file for complete search history.

(56) References Cited

U.S. PATENT DOCUMENTS

| | | |
|---|---|---|
| 2013/0008528 A1* | 1/2013 | Mitsuda ................ F01N 3/2839 137/343 |
| 2020/0200108 A1 | 6/2020 | Katoh et al. |
| 2020/0370485 A1 | 11/2020 | Katoh et al. |
| 2020/0370486 A1 | 11/2020 | Katoh et al. |
| 2020/0370487 A1 | 11/2020 | Katoh et al. |
| 2020/0370488 A1 | 11/2020 | Katoh et al. |
| 2020/0370489 A1 | 11/2020 | Katoh et al. |
| 2020/0370490 A1 | 11/2020 | Katoh et al. |
| 2020/0370491 A1 | 11/2020 | Katoh et al. |
| 2020/0378325 A1 | 12/2020 | Katoh et al. |
| 2020/0378326 A1 | 12/2020 | Katoh et al. |
| 2020/0378327 A1 | 12/2020 | Katoh et al. |
| 2020/0400087 A1 | 12/2020 | Katoh et al. |
| 2022/0034251 A1 | 2/2022 | Katoh et al. |
| 2022/0034252 A1 | 2/2022 | Katoh et al. |

* cited by examiner

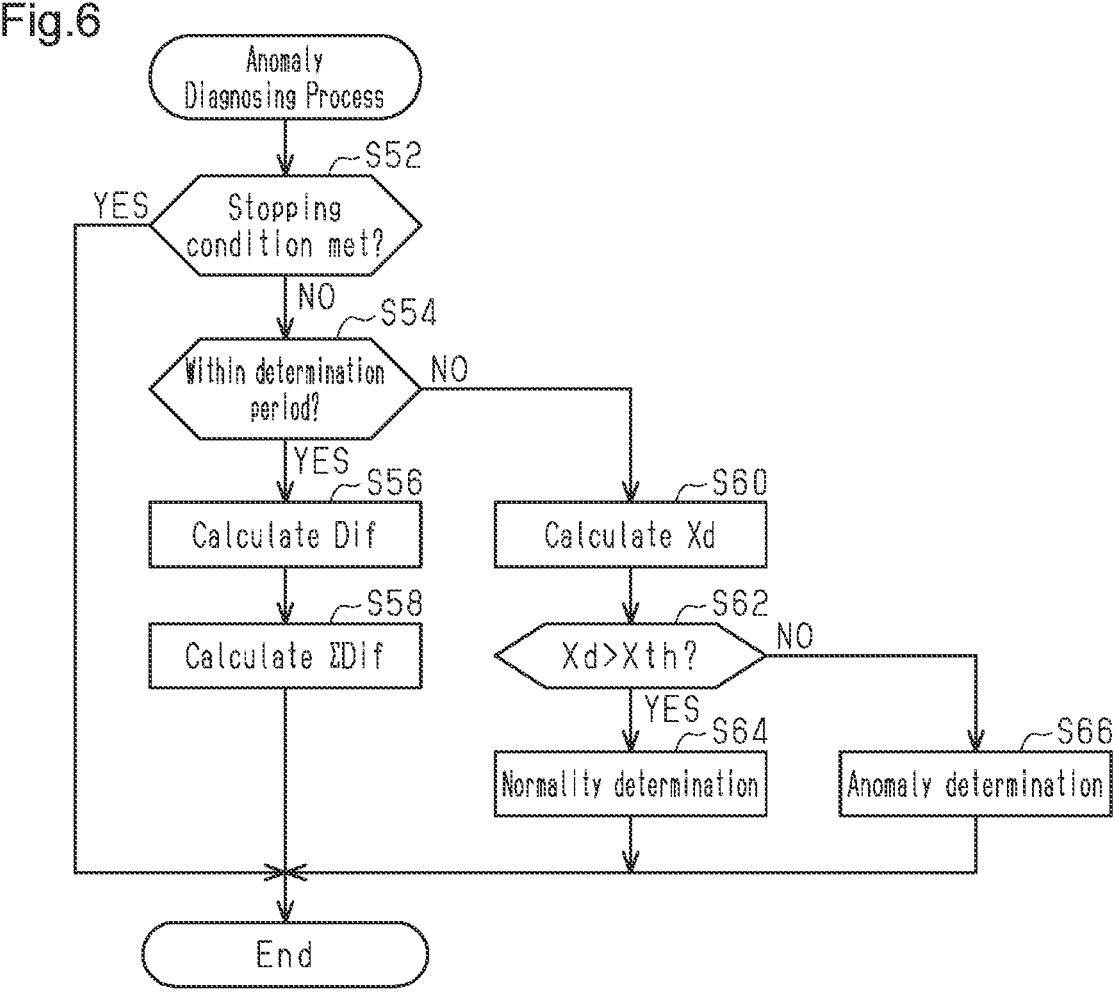

CONTROLLER AND CONTROL METHOD FOR INTERNAL COMBUSTION ENGINE

BACKGROUND

1. Field

The present disclosure relates to a controller and a control method for an internal combustion engine.

2. Description of Related Art

An exhaust purification device disposed in an exhaust passage has a thermal capacity. The heat of the exhaust gas conducted into the exhaust purification device is consumed by heat exchange with the exhaust purification device. As a result, there is a difference between a change in an exhaust gas temperature on the upstream side of the exhaust purification device and a change in the exhaust gas temperature on the downstream side of the exhaust purification device.

Japanese Laid-Open Patent Publication No. 2020-106028 discloses a controller for an internal combustion engine that detects that a filter for trapping particulate matter in exhaust gas has been removed from an exhaust passage. The controller disclosed in the above publication compares a change in the exhaust gas temperature on the upstream side of the filter with a change in the exhaust gas temperature on the downstream side of the filter. Then, the controller determines that the filter has been removed based on a difference between the change in the exhaust gas temperature on the upstream side of the filter and the change in the exhaust gas temperature on the downstream side of the filter.

The controller disclosed in the above publication makes an anomaly determination that an exhaust purification device such as a filter has been removed. Such a controller is required to make an anomaly determination with high accuracy.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a controller for an internal combustion engine is provided. An exhaust purification device is disposed in an exhaust passage of the internal combustion engine. The internal combustion engine is configured to execute a fuel cutoff operation in which an engine output shaft is rotated with fuel supply stopped. The controller includes processing circuitry. The processing circuitry is configured to execute a first change amount calculating process, a second change amount calculating process, a determination process, and an anomaly diagnosing process. The first change amount calculating process is a process of calculating a first change amount that is a change amount per unit time of an upstream-side temperature. The upstream-side temperature is a temperature of exhaust gas on an upstream side of the exhaust purification device. The second change amount calculating process is a process of calculating a second change amount that is a change amount per unit time of a downstream-side temperature. The downstream-side temperature is a temperature of exhaust gas on a downstream side of the exhaust purification device. The determination process is a process of determining that a deviation between the first change amount during the fuel cutoff operation and the second change amount during the fuel cutoff operation is less than or equal to a threshold. The anomaly diagnosing process is a process of determining that the exhaust purification device is in a detached state when it is determined in the determination process that the deviation is less than or equal to the threshold.

In another general aspect, a control method for an internal combustion engine is provided. An exhaust purification device is disposed in an exhaust passage of the internal combustion engine. The internal combustion engine is configured to execute a fuel cutoff operation in which an engine output shaft is rotated with fuel supply stopped. The control method comprises: calculating a first change amount that is a change amount per unit time of an upstream-side temperature, the upstream-side temperature being a temperature of exhaust gas on an upstream side of the exhaust purification device; calculating a second change amount that is a change amount per unit time of a downstream-side temperature, the downstream-side temperature being a temperature of exhaust gas on a downstream side of the exhaust purification device; determining that a deviation between the first change amount during the fuel cutoff operation and the second change amount during the fuel cutoff operation is less than or equal to a threshold; and determining that the exhaust purification device is in a detached state when it is determined that the deviation is less than or equal to the threshold.

Other features and aspects will be apparent from the following detailed description, the drawings, and the claims.

BRIEF DESCRIPTION OF THE DRAWINGS

FIG. 6 is a flowchart showing the procedure of a subroutine related to the anomaly diagnosing process executed by the engine control unit of FIG. 1.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, except for operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

An engine control unit 110, which is a controller for an internal combustion engine according to one embodiment, will now be described with reference to FIGS. 1 to 6.

Configuration of Vehicle

Figure 1:
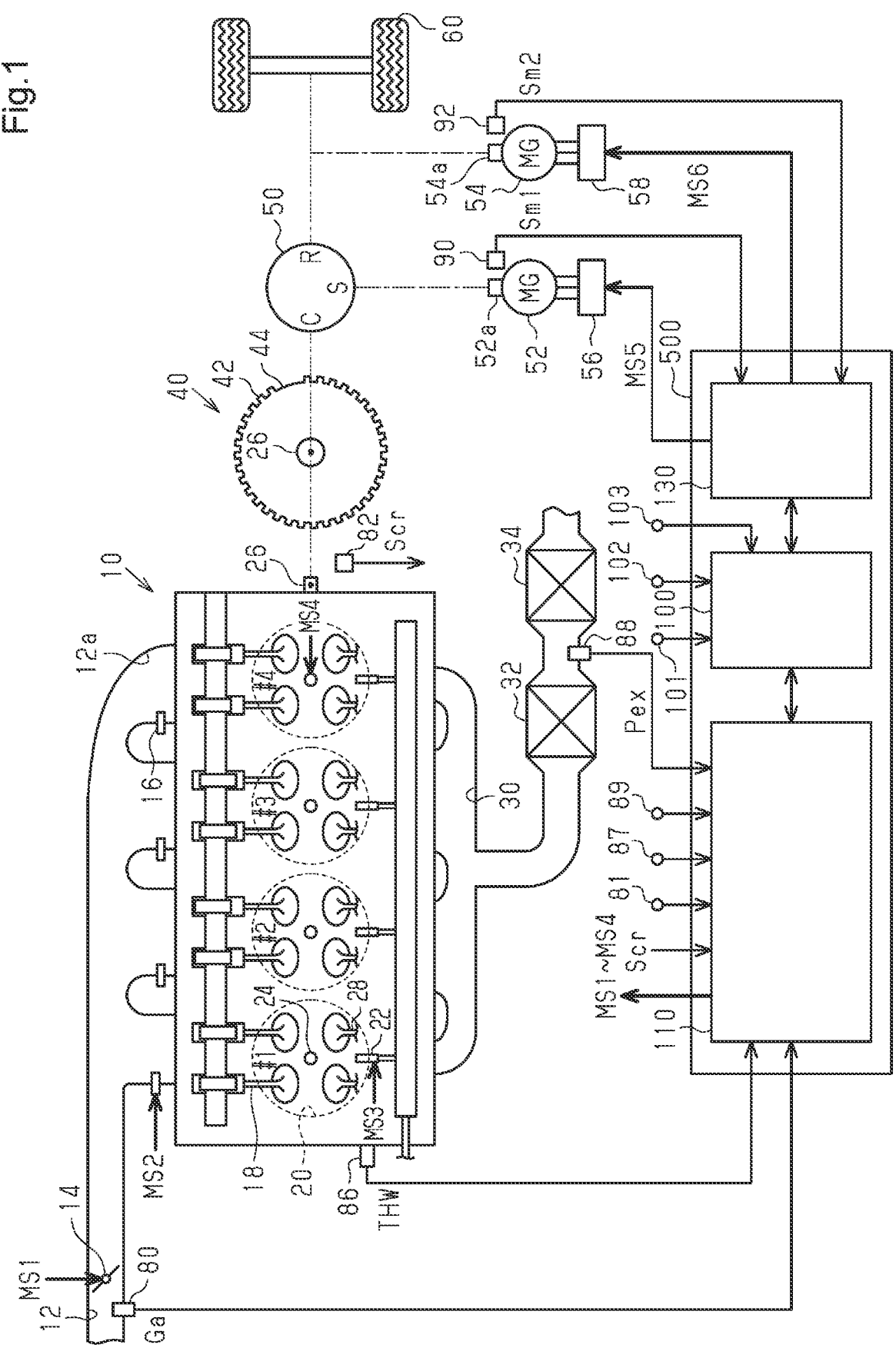
FIG. 1 is a schematic diagram showing a configuration of an engine control unit, which is a controller for an internal combustion engine according to an embodiment, an engine controlled by the engine control unit, and a hybrid electric vehicle including the engine.

As shown in FIG. 1, an engine 10 includes four cylinders #1 to #4. An intake passage 12 of the engine 10 incorporates a throttle valve 14. The intake passage 12 includes four intake ports 12a in a downstream section. Each intake port 12a is provided with a port injection valve 16, which injects fuel into the intake port 12a. Air drawn into the intake passage 12 and fuel injected from the port injection valves 16 flow into combustion chambers 20 when intake valves 18 are opened. The engine 10 is provided with direct injection valves 22, which respectively inject fuel into the cylinders #1 to #4. The direct injection valves 22 inject fuel into the combustion chambers 20 in some cases. The air-fuel mixture in each combustion chamber 20 is burned by spark discharge of an ignition plug 24. This generates combustion energy, which is in turn converted into rotational energy of a crankshaft 26.

The air-fuel mixture burned in the combustion chambers 20 is discharged to an exhaust passage 30 as exhaust gas when exhaust valves 28 are opened. The exhaust passage 30 is provided with a three-way catalyst 32, which has an oxygen storage capacity, and a gasoline particulate filter (GPF) 34. The three-way catalyst 32 and the GPF 34 are exhaust purification devices. The GPF 34 includes a filter that traps particulate matter (PM) contained in exhaust gas, and supports a three-way catalyst.

A crank rotor 40 having thirty-two teeth 42 is coupled to the crankshaft 26. The teeth 42 are generally arranged at 10° C.A intervals on the crank rotor 40. Thus, the crank rotor 40 also has a toothless section 44, at which the interval between the adjacent teeth 42 is wider than 10° C.A. The toothless section 44 is designed to indicate a referential rotation angle of the crankshaft 26.

The crankshaft 26 is mechanically coupled to a carrier C of a planetary gear mechanism 50, which is part of a power splitter. The planetary gear mechanism 50 includes a sun gear S, which is mechanically coupled to a rotary shaft 52a of a first motor-generator 52. The planetary gear mechanism 50 includes a ring gear R, which is mechanically coupled to a rotary shaft 54a of a second motor-generator 54 and to driven wheels 60. Alternating-current voltage of an inverter 56 is applied to terminals of the first motor-generator 52. Alternating-current voltage of an inverter 58 is applied to terminals of the second motor-generator 54.

Controller 500

A controller 500 controls the engine 10, the first motor-generator 52, and the second motor-generator 54. The controller 500 includes the engine control unit 110, which controls the engine 10. The controller 500 includes a motor control unit 130, which controls the first motor-generator 52 and the second motor-generator 54. The controller 500 further includes a general control unit 100, which oversees control of the vehicle. The general control unit 100 is connected to the engine control unit 110 and the motor control unit 130. Each of these control units includes processing circuitry and a memory storing programs executed by the processing circuitry.

The controller 500 controls the engine 10, the first motor-generator 52, and the second motor-generator 54. That is, the controller 500 controls the power train of the vehicle. The controller 500 receives detection signals from sensors provided at various sections in the vehicle.

The engine control unit 110 operates operated units of the engine 10, such as the throttle valve 14, the port injection valves 16, the direct injection valves 22, and the ignition plugs 24, thereby controlling torque and the ratios of exhaust components, which are controlled variables of the engine 10.

The motor control unit 130 operates the inverter 56, thereby controlling the rotation speed, which is a controlled variable of the first motor-generator 52. Further, the motor control unit 130 operates the inverter 58, thereby controlling torque, which is a controlled variable of the second motor-generator 54.

FIG. 1 shows operation signals MS1 to MS6 respectively corresponding to the throttle valve 14, the port injection valves 16, the direct injection valves 22, the ignition plugs 24, and the inverters 56, 58. To control controlled variables of the engine 10, the engine control unit 110 refers to an intake air amount Ga detected by an air flow meter 80. The engine control unit 110 also refers to an output signal Scr of a crank angle sensor 82, a coolant temperature THW detected by a coolant temperature sensor 86, and a pressure Pex of exhaust gas flowing into the GPF 34 detected by an exhaust pressure sensor 88. The motor control unit 130 refers to an output signal Sm1 from a first rotation angle sensor 90 in order to control the controlled variable of the first motor-generator 52. The first rotation angle sensor 90 detects a rotation angle of the first motor-generator 52. The motor control unit 130 refers to an output signal Sm2 from a second rotation angle sensor 92 in order to control the controlled variable of the second motor-generator 54. The second rotation angle sensor 92 detects a rotation angle of the second motor-generator 54.

Each of the engine control unit 110 and the motor control unit 130 is connected to the general control unit 100 by a communication line. The general control unit 100, the motor control unit 130, and the engine control unit 110 exchange and share calculated information and information based on detection signals from sensors through CAN communication.

The general control unit 100 is connected to an accelerator position sensor 101, a brake sensor 102, and a vehicle speed sensor 103. The accelerator position sensor 101 detects an operated amount of the accelerator. The brake sensor 102 detects an operated amount of the brake. The vehicle speed sensor 103 detects a vehicle speed, which is the speed of the vehicle.

An air-fuel ratio sensor 81 is provided in the exhaust passage 30. The air-fuel ratio sensor 81 is connected to the engine control unit 110. The air-fuel ratio sensor 81 detects an air-fuel ratio.

An upstream-side temperature sensor 87, which detects an upstream-side temperature Tin, is connected to the engine control unit 110. The upstream-side temperature Tin is a temperature of the exhaust gas between the three-way catalyst 32 and the GPF 34 in the exhaust passage 30. Also, a downstream-side temperature sensor 89, which detects a downstream-side temperature Tout, is connected to the engine control unit 110. The downstream-side temperature Tout is a temperature of the exhaust gas on the downstream side of the GPF 34.

The engine control unit 110 estimates a catalyst temperature and a GPF temperature based on an engine load factor KL, an engine rotation speed NE, and the temperatures of the exhaust gas detected by the upstream-side temperature sensor 87 and the downstream-side temperature sensor 89. The catalyst temperature is the temperature of the three-way catalyst 32. The GPF temperature is the temperature of the GPF 34.

The engine control unit 110 calculates a counter CNT by counting the number of times that the output signal Scr of the crank angle sensor 82 has been input. The value of the counter CNT corresponds to the crank angle, and the larger the value, the larger the crank angle. When the counter CNT reaches 720° C.A, which is a value corresponding to 0° C.A, the counter CNT is reset to 0 again. The crank angle corresponding to the state in which the counter CNT is 0 is the crank angle at the compression top dead center.

Manner in which Fuel Injection is Performed

The engine control unit 110 changes the manner in which fuel injection is performed in the engine 10 in accordance with the engine load factor KL and the engine rotation speed NE. For example, in a high-load zone, the engine 10 supplies fuel only by direct injection, which is fuel injection by the direct injection valves 22. In a low-load zone, the engine 10 supplies fuel only by port injection, which is fuel injection by the port injection valves 16. The engine 10 may supply fuel by port injection and direct injection. In this case, the engine control unit 110 changes the ratio between the port injection and the direct injection in accordance with the engine load factor KL and the engine rotation speed NE. In this way, the engine 10 forms an air-fuel mixture suitable for combustion.

The engine rotation speed NE is calculated by the engine control unit 110 based on the output signal Scr. The engine load factor KL is calculated by the engine control unit 110 based on the intake air amount Ga and the engine rotation speed NE.

Regeneration Process

Figure 2:
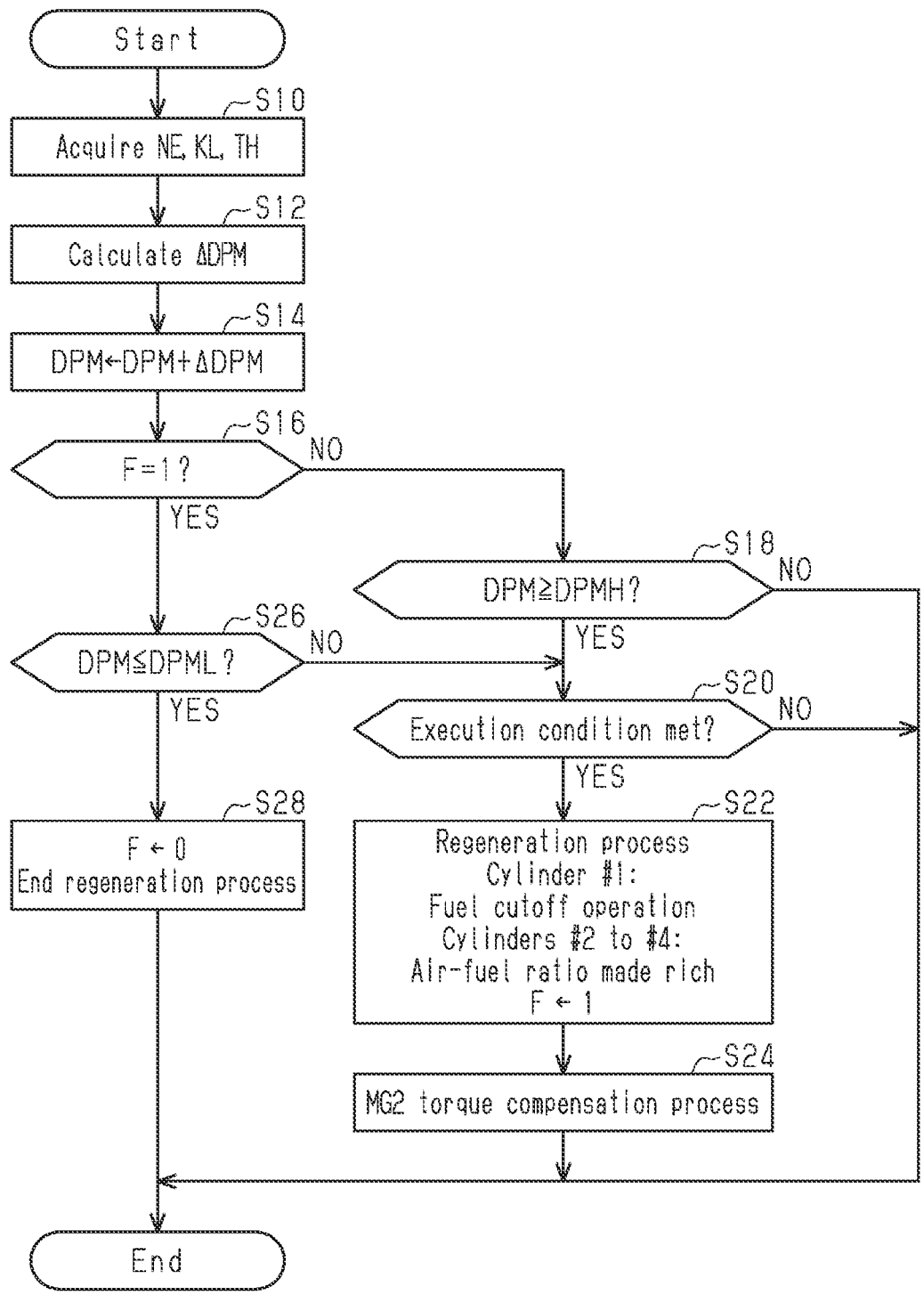
FIG. 2 is a flowchart showing the procedure of a routine related to a regeneration process executed by the engine control unit of FIG. 1.

FIG. 2 shows a procedure in a routine related to a regeneration process executed by the engine control unit 110. The routine shown in FIG. 2 is performed by the processing circuitry repeatedly executing programs stored in the memory at a specific interval. In the following description, the number of each step is represented by the letter S followed by a numeral.

In the routine shown in FIG. 2, the engine control unit 110 first acquires the engine rotation speed NE, the engine load factor KL, and the coolant temperature THW (S10). Next, the engine control unit 110 calculates an update amount ΔDPM of an accumulated amount DPM based on the engine rotation speed NE, the engine load factor KL, and the coolant temperature THW (S12). The accumulated amount DPM is the amount of PM trapped by the GPF 34. Specifically, the engine control unit 110 calculates the amount of PM in the exhaust gas discharged to the exhaust passage 30 based on the engine rotation speed NE, the engine load factor KL, and the coolant temperature THW. The engine control unit 110 calculates the update amount ΔDPM based on the amount of PM in the exhaust gas and the GPF temperature.

Next, the engine control unit 110 sets a new accumulated amount DPM to the sum of the accumulated amount DPM and the update amount ΔDPM. In this way, the engine control unit 110 updates the accumulated amount DPM (S14). Next, the engine control unit 110 determines whether a flag F is 1 (S16). The value 1 of the flag F indicates that a regeneration process for burning and removing the PM in the GPF 34 is being executed. The value 0 of the flag F indicates that the regeneration process is not being executed. When determining that the flag F is 0 (S16: NO), the engine control unit 110 determines whether the accumulated amount DPM is greater than or equal to a regeneration execution value DPMH (S18). The regeneration execution value DPMH is a threshold used by the engine control unit 110 to determine that PM needs to be removed based on the accumulated amount DPM being greater than or equal to the regeneration execution value DPMH.

When determining that the accumulated amount DPM is greater than or equal to the regeneration execution value DPMH (S18: YES), the engine control unit 110 determines whether an execution condition for the regeneration process is met (S20). The execution condition may be a condition that the logical conjunction of Condition (1) to Condition (3), which are shown below, is true.

Condition (1): a condition that an engine torque command value Te*, which is a command value of torque to the engine 10, is greater than or equal to a specific value Teth.

Condition (2): a condition that the engine rotation speed NE is greater than or equal to a specific speed.

Condition (3): a condition that a torque compensation process of S24 can be executed.

When determining that the logical conjunction is true (S20: YES), the engine control unit 110 executes the regeneration process and assigns 1 to the flag F (S22). Specifically, the engine control unit 110 stops fuel injection from the port injection valve 16 and the direct injection valve 22 of the cylinder #1. Then, the engine control unit 110 makes the air-fuel ratio of the air-fuel mixture in the combustion chambers 20 of the cylinders #2 to #4 richer than the stoichiometric air-fuel ratio. That is, the regeneration process is a stopping process in which fuel supply to one of the cylinders is stopped and fuel is supplied to the remaining cylinders. This process discharges oxygen and unburned fuel to the exhaust passage 30 in order to increase the temperature of the GPF 34, thereby burning and removing the PM trapped by the GPF 34. That is, the engine control unit 110 discharges oxygen and unburned fuel to the exhaust passage 30, so as to burn the unburned fuel in the three-way catalyst 32 and the like, thereby increasing the temperature of the exhaust gas. This raises the temperature of the GPF 34. Also, the engine control unit 110 supplies oxygen to the GPF 34, so as to burn and remove PM trapped by the GPF 34.

The cylinder to which supply of fuel is stopped is not limited to the cylinder #1. For example, to prevent an imbalance in the frequency of stopping fuel supply, the cylinder in which the fuel supply is stopped may be switched in a sequential manner.

The engine control unit 110 requests the motor control unit 130 to execute a process of compensating for the torque fluctuation of the crankshaft 26 of the engine 10 caused by the stop of the combustion control of the cylinder #1 (S24). Upon receiving the request, the motor control unit 130 superimposes compensation torque on required torque. The required torque is a torque that the second motor-generator 54 is required to generate to cause the vehicle to travel. Then, the motor control unit 130 operates the inverter 58 based on the required torque on which the compensation torque has been superimposed.

Examples of conditions under which the torque compensation process can be executed may include a condition that the second motor-generator 54 has no anomalies and a condition that the battery has enough electric power to execute the torque compensation process.

When determining that the flag F is 1 (S16: YES), the engine control unit 110 determines whether the accumulated amount DPM is less than or equal to a stopping threshold DPML (S26). The stopping threshold DPML is a threshold used by the engine control unit 110 to determine that the regeneration process can be stopped based on the accumulated amount DPM being less than or equal to the stopping threshold DPML. When the accumulated amount DPM is less than or equal to the stopping threshold DPML (S26: YES), the engine control unit 110 stops the regeneration process and assigns 0 to the flag F (S28).

When completing the process of S24 or S28, or when making a negative determination in the process of S18 or S20, the engine control unit 110 temporarily suspends the series of processes shown in FIG. 2.

Anomaly Diagnosing Process

If the exhaust purification device is removed from the exhaust passage 30, the exhaust gas cannot be purified. Accordingly, the engine control unit 110 executes an anomaly diagnosing process in order to determine that the exhaust purification device is in a detached state.

Figure 3:
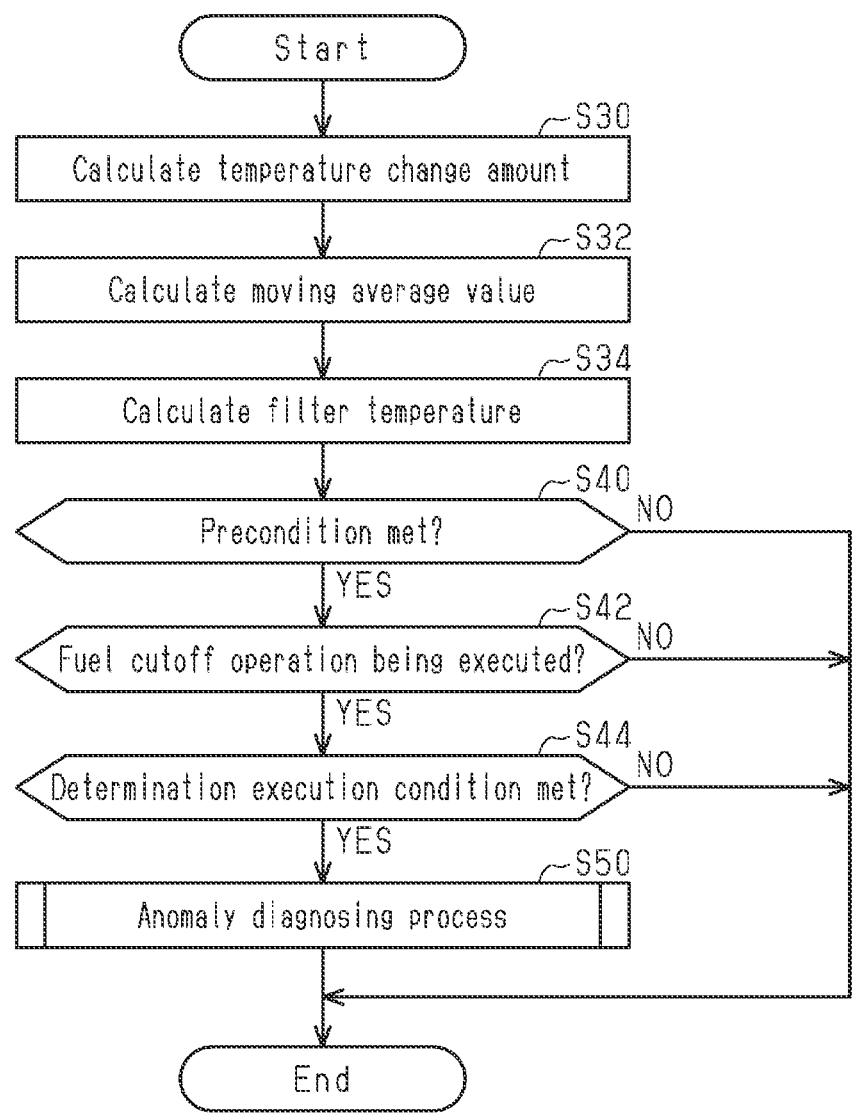
FIG. 3 is a flowchart showing the procedure of a main routine related to an anomaly diagnosing process executed by the engine control unit of FIG. 1.

FIG. 3 shows a procedure in a main routine related to the anomaly diagnosing process executed by the engine control unit 110. The routine shown in FIG. 3 is performed by the processing circuitry executing programs stored in the memory. During each trip, from when the main switch of the vehicle is turned ON to when it is turned OFF, the engine control unit 110 executes the anomaly diagnosing process if the anomaly diagnosing process has not been completed. The engine control unit 110 repeatedly executes the anomaly diagnosing process. Specifically, the anomaly diagnosing process is executed once per trip. In the following description, the number of each step is represented by the letter S followed by a numeral.

In the routine shown in FIG. 3, the engine control unit 110 first calculates a temperature change amount (S30). The temperature change amount includes a change amount of the upstream-side temperature Tin, detected by the upstream-side temperature sensor 87, and a change amount of the downstream-side temperature Tout, detected by the downstream-side temperature sensor 89. That is, the engine control unit 110 calculates the amount of change in the upstream-side temperature Tin and the amount of change in the downstream-side temperature Tout. The upstream-side temperature Tin is the temperature of the exhaust gas flowing into the GPF 34, which is an exhaust purification device. The downstream-side temperature Tout is the temperature of the exhaust gas flowing out from the GPF 34. Hereinafter, the amount of change in the upstream-side temperature Tin is referred to as a first change amount ΔTin. The amount of change in the downstream-side temperature Tout will be referred to as a second change amount ΔTout.

In this manner, the engine control unit 110 executes a first change amount calculating process of calculating the first change amount ΔTin, which is a change amount per unit time of the upstream-side temperature Tin, which is the temperature of the exhaust gas on the upstream side of the exhaust purification device, in the process of S30.

Also, the engine control unit 110 executes a second change amount calculating process of calculating the second change amount ΔTout, which is a change amount per unit time of the downstream-side temperature Tout, which is the temperature of the exhaust gas on the downstream side of the exhaust purification device, in the process of S30.

The engine control unit 110 executes this routine at regular intervals, for example, every 65 milliseconds, and samples the upstream-side temperature Tin and the downstream-side temperature Tout. In the first change amount calculating process of the S30, the engine control unit 110 calculates a difference by subtracting the upstream-side temperature Tin sampled in the previous cycle from the upstream-side temperature Tin sampled in the current cycle. Then, the calculated difference is stored in the memory as the first change amount ΔTin. Similarly, in the second change amount calculating process of the S30, the engine control unit 110 calculates a difference by subtracting the downstream-side temperature Tout sampled in the previous cycle from the downstream-side temperature Tout sampled in the current cycle. Then, the calculated difference is stored in the memory as the second change amount ΔTout.

Next, the engine control unit 110 calculates a moving average value of the first change amount ΔTin (S32). To be specific, in the process of S32, the engine control unit 110 calculates a long-term moving average value of the first change amount ΔTin and a short-term moving average value of the first change amount ΔTin. The long-term moving average value is an exponential moving average, for example, a 10-second moving average. The short-term moving average is also an exponential moving average, for example, a 3-second moving average.

The exponential moving average is calculated based on the following Expression (1).

$$S_t = \alpha \times Y_t + (1-\alpha) \times S_{t-1} \qquad \text{Expression (1)}$$

In Expression (1), α represents is a smoothing coefficient. The smoothing coefficient α is calculated based on the following Equation (2).

$$\alpha = \frac{2}{N+1} \qquad \text{Expression (2)}$$

In Expression (2), N represents is the number of samples. When the long-term moving average value is calculated, the number of times the first change amount ΔTin is acquired in 10 seconds is N. When the short-term moving average value is calculated, the number of times the first change amount ΔTin is acquired in 3 seconds is N. Since the first change amount ΔTin is calculated every 65 milliseconds, the first change amount ΔTin is calculated 153 times in 10 seconds. That is, when the long-term moving average value is calculated, the number of samples is 153, so that the smoothing coefficient α is 0.013. Also, the first change amount ΔTin is calculated 46 times in 3 seconds. That is, when the short-term moving average value is calculated, the number of samples is 46, so that the smoothing coefficient α is 0.0426.

In Expression (1), S represents an exponential moving average of the first change amount ΔTin. In Expression (1), Y represents is the first change amount ΔTin. The subscripts t and t−1 indicate a difference between calculated times. That is, the subscript t−1 indicates that it is the value calculated in the previous cycle. The initial value of S is 0.

As shown in Expression (1), the long-term moving average value and the short-term moving average value, which are exponential moving averages, are the sum of the product obtained by multiplying the first change amount ΔTin by the smoothing coefficient α and the product obtained by multiplying the exponential moving average S calculated in the previous cycle by the difference obtained by subtracting the smoothing coefficient α from 1.

As described above, when the long-term moving average value is calculated, the smoothing coefficient α is set to 0.013. When the short-term moving average value is calculated, the smoothing coefficient α is set to 0.0426.

As described above, in the process of S32, the engine control unit 110 executes a first average value calculating process and a second average value calculating process. The first average value calculating process is a process of calculating a short-term moving average value of the upstream-side temperature Tin. The second average value calculating process is a process of calculating a long-term moving average value, which is an exponential moving average in a period longer than a period in which the short-term moving average value is calculated.

After calculating the long-term moving average value and the short-term moving average value, the engine control unit 110 calculates a filter temperature (S34). The engine control unit 110 calculates the temperature of a portion 10 millimeters away from the front end of the GPF 34 as a front-side temperature TFr. Also, the engine control unit 110 calculates the temperature of a portion 10 millimeters away from the rear end of the GPF 34 as a rear-side temperature TRr. That is, in process of S34, the engine control unit 110 executes a front-end temperature estimating process of estimating the front-side temperature TFr and a rear-end temperature estimating process of estimating the rear-side temperature TRr. The front-side temperature TFr is the temperature of a section of the GPF 34 between the center and the front end, and the rear-side temperature TRr is the temperature of a section of the GPF 34 between the center and the rear end.

The front-side temperature TFr is calculated based on the following Expression (3).

$$TFr_t = \frac{Tin + ofs1 - TFr_{t-1}}{KFr} + TFr_{t-1} \quad \text{Expression (3)}$$

In Expression (3), ofs1 represents a front-end offset value. In Expression (3), KFr represents a front-end responsiveness reducing coefficient. In Expression (3), the subscripts t and t−1 indicate a difference between calculated times. That is, the subscript t−1 indicates that it is the value calculated in the previous cycle. The initial value of the front-side temperature TFr is the upstream-side temperature Tin.

Further, the rear-side temperature TRr is calculated based on the following Expression (4).

$$TRr_t = \frac{Tin + ofs2 - TRr_{t-1}}{KRr} + TRr_{t-1} \quad \text{Expression (4)}$$

In Expression (4), ofs2 represents a rear-end offset value. In Expression (4), KRr represents a rear-end responsiveness reducing coefficient. In Expression (4), the subscripts t and t−1 indicate a difference between calculated times. That is, the subscript t−1 indicates that it is the value calculated in the previous cycle. The initial value of the rear-side temperature TRr is the upstream-side temperature Tin.

The front-end responsiveness reducing coefficient KFr and the rear-end responsiveness reducing coefficient KRr are determined based on the intake air amount Ga. The front-end responsiveness reducing coefficient KFr and the rear-end responsiveness reducing coefficient KRr decrease as the intake air amount Ga increases. The rear-end responsiveness reducing coefficient KRr is smaller than the front-end responsiveness reducing coefficient KFr.

The magnitude of the front-end offset value ofs1 is set such that the temperature of a section of the GPF 34 that is 10 millimeters from the front end can be calculated based on Expression (3). The magnitude of the rear-end offset value ofs2 is set such that the temperature of a section of the GPF 34 that is 10 millimeters from the rear end can be calculated based on Expression (4). That is, the responsiveness reducing coefficient and the offset value in Expressions (3) and (4) are adjusted by adaptation so that the deviation between results of experiments and simulations performed in advance and calculation results are minimized.

When calculating the front-side temperature TFr and the rear-side temperature TRr through the process of S34, the engine control unit 110 determines whether a precondition for executing the anomaly diagnosing process is met (S40). The precondition in this case is a condition that the logical conjunction of the following conditions (4) and (5) is true.

Condition (4): a condition that no anomaly has occurred in various sensors connected to the engine control unit 110, that is, all the sensors are normal.

Condition (5): a condition that the anomaly diagnosing process has not been completed.

When the precondition is met (S40: YES), the engine control unit 110 determines whether the fuel cutoff operation is being executed (S42). The fuel cutoff operation is an operation mode in which the crankshaft 26, which is the engine output shaft, is rotated in a state in which fuel supply is stopped. Since the vehicle is a hybrid electric vehicle, when it is not necessary to operate the engine 10, the crankshaft 26 is normally stopped immediately after the engine operation is stopped. Thus, in order to perform anomaly diagnosing process in the vehicle, the first motor-generator 52 drives the crankshaft 26 so that the crankshaft 26 rotates without the supply of fuel in a state in which the engine operation would normally be stopped. This enables fuel cut-off operation to be achieved.

Figure 4:
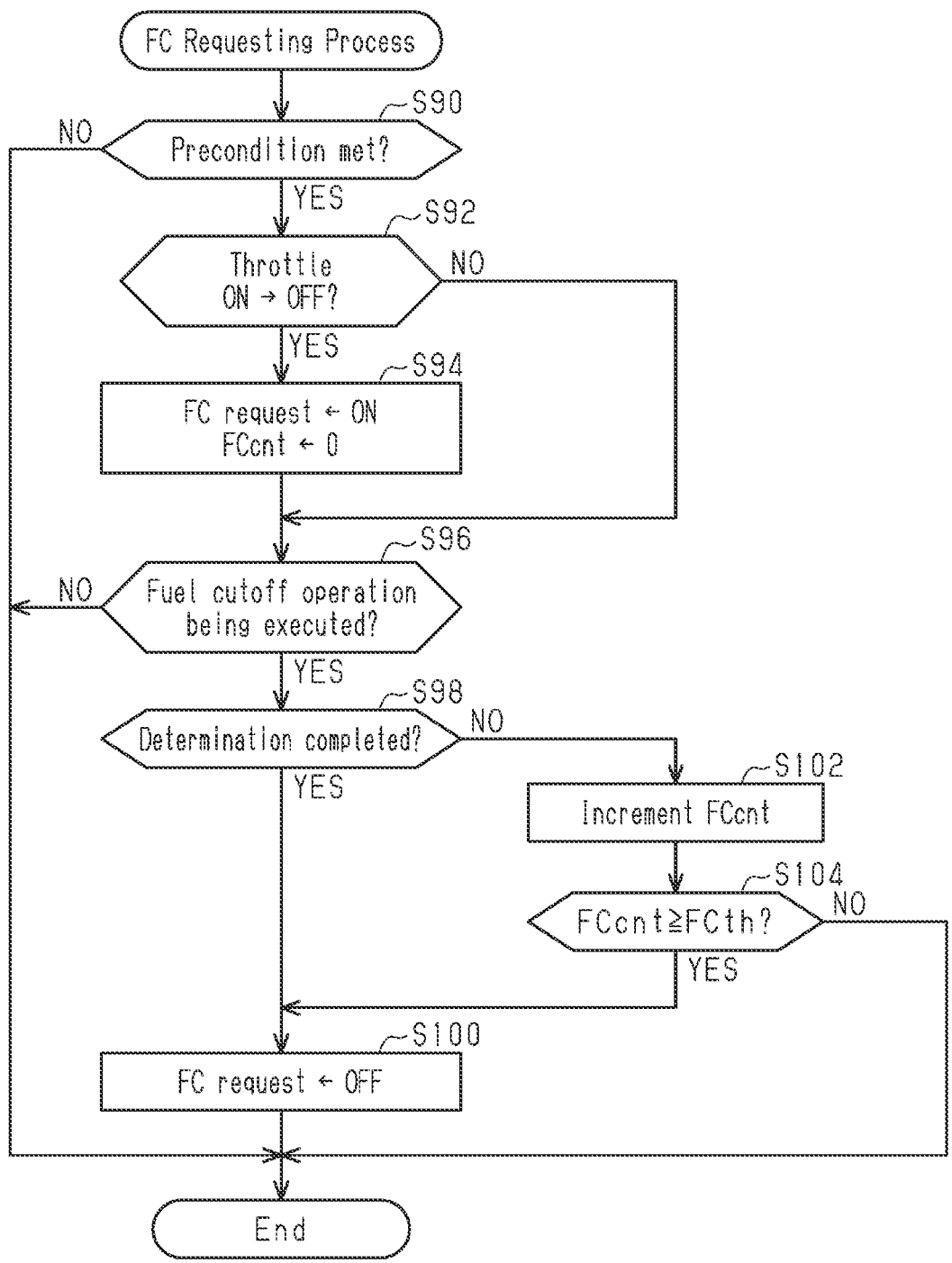
FIG. 4 is a flowchart showing the procedure of a routine related to a fuel cutoff requesting process executed by the engine control unit of FIG. 1.

The flowchart shown in FIG. 4 shows a routine related to an FC request process for switching ON and OFF of an FC request. The FC request is a command for requesting execution of the fuel cutoff operation. This routine is repeatedly executed by the general control unit 100. As will be described later, the fuel cutoff operation is executed when the FC request is turned ON through this routine.

When this routine is started, the general control unit 100 determines whether a precondition for operating the FC request is met (S90). The precondition in this case is a condition that a logical conjunction of the following conditions (6) and (7) is true.

Condition (6): a condition that no anomaly has occurred in various sensors connected to the controller 500.

Condition (7): a condition that the battery has enough electric power to rotate the crankshaft 26 to achieve the fuel cutoff operation.

If the precondition is met (S90: YES), the general control unit 100 determines whether the throttle valve 14 is turned OFF (S92). That is, the general control unit 100 determines whether the accelerator is released so that the throttle valve 14 is closed.

When determining that the throttle valve 14 is turned OFF (S92: YES), the general control unit 100 turns ON the FC request and resets an FC counter FCcnt to 0 (S94). When the FC request is turned ON through the process of S94, the engine control unit 110 stops fuel supply in the engine 10. At this time, the motor control unit 130 drives the crankshaft 26 using the first motor-generator 52. The fuel cutoff operation is thus executed.

Next, the general control unit 100 determines whether the fuel cutoff operation is being executed (S96). When determining that the throttle valve 14 has not been turned OFF (S92: NO), the general control unit 100 advances the process to S94 without executing the process of S96.

When determining in the process of S96 that the fuel cutoff operation is being executed (S96: YES), the general control unit 100 determines whether determination in the anomaly diagnosing process has been completed (S98). The determination in the anomaly diagnosing process is an anomaly determination or a normality determination, which will be discussed below.

When determining that the determination in the anomaly diagnosis has already been completed in the S98 (S98: YES), the general control unit 100 turns OFF the FC request (S100). Thus, the fuel cutoff operation is ended. When the fuel cutoff operation is ended in this way, the general control unit 100 ends the series of routines.

When determining that the determination has not been completed in S98 (S98: NO), the general control unit 100 increments the FC counter FCcnt (S102). Then, the general control unit 100 determines whether the FC counter FCcnt is greater than or equal to a threshold FCth (S104).

When determining in S104 that the FC counter FCcnt is less than the threshold FCth (S104: NO), the general control unit 100 temporarily ends this routine. In this case, the fuel cutoff operation is continued.

When determining in S104 that the FC counter FCcnt is greater than or equal to the threshold FCth (S104: YES), the general control unit 100 turns OFF the FC request (S100). Thus, when the FC counter FCcnt reaches the threshold FCth before the determination by the anomaly diagnosing process is completed, the fuel cutoff operation is ended. When the fuel cutoff operation is ended in this way, the general control unit 100 ends the series of routines.

If the fuel cutoff operation is continued for an extended period of time, the temperature of the exhaust purification device becomes low, and the anomaly diagnosing process cannot be executed properly. Therefore, when determining that the FC counter FCcnt is greater than or equal to the threshold FCth (S104: YES), the general control unit 100 ends the fuel cutoff operation and interrupts the anomaly diagnosing process.

When determining that the precondition is not met in the process of S90 (S90: NO), the general control unit 100 ends the series of routines without executing the processes of S92 to S104. When determining in the process of S96 that the fuel cutoff operation is not being executed (S96: NO), the general control unit 100 ends the series of routines without executing the processes of S98 to S104. The fuel cutoff operation is executed through the FC request process executed by the general control unit 100 as described above.

Referring back to FIG. 3, when determining in the process of S42 that the fuel cutoff operation is being executed (S42: YES), the engine control unit 110 determines whether a determination execution condition is met (S44). The determination execution condition is a condition that a logical conjunction of the following conditions (8) to (11) is true.

Condition (8): a condition that warm-up has been completed.

Condition (9): a condition that the upstream-side temperature Tin exhibits an increasing tendency and the front-side temperature TFr is higher than or equal to the rear-side temperature TRr.

Condition (10): a condition that the air-fuel ratio detected by the air-fuel ratio sensor 81 is within a specified range indicating that the engine 10 has been operated at the stoichiometric air-fuel ratio.

Condition (11): a condition that it has been determined that there is no influence of the regeneration process.

It is determined that the upstream-side temperature Tin exhibits an increasing tendency based on a differential value of the short-term moving average value and a differential value of the long-term moving average value, which are calculated through the process of S32, both being greater than or equal to a specified value. The magnitude of the specified value is set to a magnitude with which it can be determined that the upstream-side temperature Tin exhibits an increasing tendency based on the differential values being greater than or equal to the specified value. The value of the specified value does not necessarily need to be a positive value.

Figure 5:
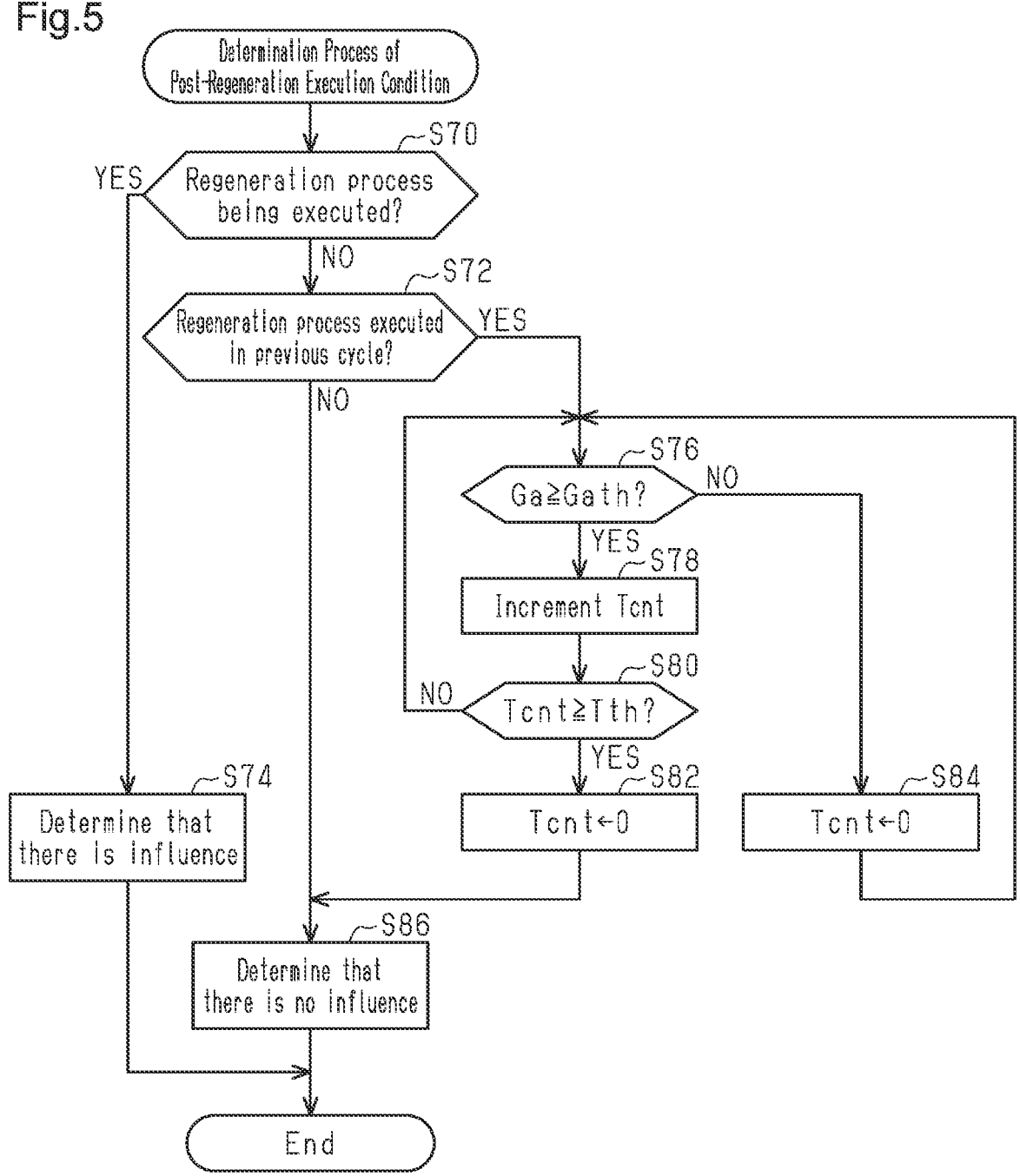
FIG. 5 is a flowchart showing the procedure of a routine related to a determination process of a post-regeneration execution condition executed by the engine control unit of FIG. 1.

The determination that there is no influence of the regeneration process is performed through a routine shown in FIG. 5. FIG. 5 is a flowchart showing the procedure of a determination process of a post-regeneration execution condition.

This routine is repeatedly executed by the engine control unit 110 during operation of the engine 10. As shown in FIG. 5, when this routine is started, the engine control unit 110 determines whether the regeneration process is being executed (S70). In the process of S70, when determining that the regeneration process is being executed (S70: YES), the engine control unit 110 determines that there is an influence of the regeneration process (S74). Then, the engine control unit 110 temporarily ends this routine.

When determining in the process of S70 that the regeneration process is not being executed (S70: NO), the engine control unit 110 determines whether the regeneration process was executed in the previous cycle of the routine (S72). When determining in the process of S72 that the regeneration process was not executed in the previous cycle (S72: NO), the engine control unit 110 determines that there is no influence of the regeneration process (S86). Then, the engine control unit 110 temporarily ends this routine.

In the process of S72, when determining that the regeneration process was executed in the previous cycle (S72: YES), the engine control unit 110 determines whether the intake air amount Ga is greater than or equal to a specified amount Gath (S76). In the process of S76, when determining that the intake air amount Ga is greater than or equal to the specified amount Gath (S76: YES), the engine control unit 110 increments a time counter Tcnt (S78). Then, the engine control unit 110 determines whether the time counter Tcnt is greater than or equal to a threshold Tth (S80).

In the process of S80, when determining that the time counter Tcnt is greater than or equal to the threshold Tth (S80: YES), the engine control unit 110 resets the time counter Tcnt to 0 (S82). Then, the engine control unit 110 determines that there is no influence of the regeneration process (S86). Then, the engine control unit 110 temporarily ends this routine.

When determining in the process of S80 that the time counter Tcnt is less than the threshold Tth (S80: NO), the engine control unit 110 returns to the process of S76. In the process of S76, when determining that the intake air amount Ga is less than the specified amount Gath (S76: NO), the engine control unit 110 resets the time counter Tcnt to 0 (S84). Then, the engine control unit 110 returns to the process of S76.

In this manner, the engine control unit 110 executes the processes of S76 to S84 after executing the regeneration process (S72: YES). Then, when the state in which the intake air amount Ga is greater than or equal to the specified amount Gath (S76: YES) continues for a specified time or longer (S80: YES), it is determined that the influence of the regeneration process has disappeared (S86).

The threshold Tth and the specified amount Gath may be set such that it can be determined that the temperature of the exhaust purification device has dropped to a level that does not adversely affect the anomaly diagnosing process through the processes of S76 to S84.

As described above, the determination execution condition includes a condition that it is determined that there is no influence of the regeneration process. That is, the determination that the influence is eliminated by the process of the S86 is the post-regeneration execution condition. The post-regeneration execution condition is an execution condition of the anomaly diagnosing process after the regeneration process is executed.

Referring back to FIG. 3, when determining in the process of S44 that the determination execution condition is met (S44: YES), the engine control unit 110 executes the anomaly diagnosing process (S50). When a negative determination is made in the processes of S40 to S44, the engine control unit 110 temporarily ends this routine without executing the anomaly diagnosing process.

Anomaly Diagnosing Process

Next, the contents of the anomaly diagnosing process will be described with reference to FIG. 6. FIG. 6 is a flowchart showing the procedure of a routine related to the anomaly diagnosing process. When the anomaly diagnosing process is started, the engine control unit 110 repeatedly executes this routine.

When this routine is started, the engine control unit 110 determines whether a stop condition is met (S52). The stop condition is a condition that the upstream-side temperature Tin has increased during the anomaly diagnosing process. The anomaly diagnosing process is repeatedly executed during a determination period, which will be discussed below. Therefore, the stop condition is a condition that the upstream-side temperature Tin has increased within the determination period. The engine control unit 110 determines that the upstream-side temperature Tin is increasing based on the fact that the first change amount ΔTin calculated within the determination period is not a negative value.

When determining that the stop condition is not met (S52: NO), the engine control unit 110 determines whether the current time is within the determination period (S54). In the process of S54, when determining that the current time is within the determination period (S54: YES), the engine control unit 110 calculates a difference Dif (S56). The difference Dif is obtained by subtracting the first change amount ΔTin from the second change amount ΔTout. Then, the engine control unit 110 calculates a cumulative sum EDif of the difference Dif Specifically, the difference Dif calculated through the process of S56 in the current cycle is added to the cumulative sum EDif calculated in the previous cycle. Then, the sum is used as a new cumulative sum EDif to update the cumulative sum EDif. By starting the calculation of EDif through S56 and S58, the engine control unit 110 starts the determination process. The determination period is a period until the upstream-side temperature Tin decreases by a specified temperature, for example, 25° C., from the upstream-side temperature Tin at the time when the determination process is started.

When the cumulative sum EDif is calculated through the process of S58, the engine control unit 110 temporarily ends this routine. By repeatedly executing this routine, the difference Dif calculated during the determination period is accumulated and the cumulative sum EDif is updated.

As described with reference to FIG. 3, the anomaly diagnosing process is executed on condition that the fuel cutoff operation is being executed (S42: YES). Therefore, the upstream-side temperature Tin gradually decreases while the anomaly diagnosing process is executed. When the upstream-side temperature Tin decreases by the specified temperature, it is determined that the current time is not within the determination period in the process of S54 (S54: NO).

Then, the engine control unit 110 calculates a determination parameter Xd (S60). The engine control unit 110 divides the cumulative sum EDif by the number of times the difference Dif has been accumulated. The engine control unit 110 employs the quotient thus calculated as the determination parameter Xd. That is, the determination parameter Xd is an average value of the difference Dif, which is obtained by subtracting the first change amount ΔTin from the second change amount ΔTout, in the determination period.

Next, the engine control unit 110 determines whether the determination parameter Xd is greater than a specified value Xth (S62). When determining that the determination parameter Xd is less than or equal to the specified value Xth in the process of S62 (S62: NO), the engine control unit 110 makes an anomaly determination (S66).

More specifically, in the process of S66, the engine control unit 110 determines that the deviation between the first change amount ΔTin and the second change amount ΔTout during the fuel cutoff operation is less than or equal to a threshold based on the determination result in S62. Then, based on this determination result, the engine control unit 110 makes an anomaly determination indicating that the GPF 34, which is an exhaust purification device, is in a state of being removed from the exhaust passage 30. When making an anomaly determination, the engine control unit 110 ends this routine. Thus, the anomaly diagnosing process is completed.

When determining that the determination parameter Xd is greater than the specified value Xth in the process of S62 (S62: YES), the engine control unit 110 makes a normality determination (S64). That is, the engine control unit 110 determines that the deviation between the first change amount ΔTin and the second change amount ΔTout during the fuel cutoff operation is greater than the threshold based on the determination result in the S62. Then, based on the determination result, the engine control unit 110 makes a normality determination indicating that the GPF 34, which is an exhaust purification device, has not been removed from the exhaust passage 30. When making a normality determination, the engine control unit 110 also ends this routine. Thus, the anomaly diagnosing process is completed.

The processes from S54 to S66 in the anomaly diagnosing process correspond to a determination process of determining that the deviation between the first change amount ΔTin during the fuel cutoff operation and the second change amount ΔTout during the fuel cutoff operation is less than or equal to the threshold.

When determining that the stop condition is met in the process of S52 before the anomaly diagnosing process is completed (S52: YES), the engine control unit 110 ends this routine without performing the processes of S54 to S66. That is, in this case, the engine control unit 110 interrupts the determination process and ends an anomaly process.

Operation of Present Embodiment

When the exhaust purification device is detached, heat exchange is not performed between the gas conducted into the exhaust purification device and the exhaust purification device. Therefore, the deviation between the first change amount ΔTin and the second change amount ΔTout is relatively small.

When the exhaust purification device is attached, the downstream-side temperature Tout changes due to heat exchange between the gas conducted into the exhaust purification device and the exhaust purification device. Therefore, the deviation between the first change amount ΔTin and the second change amount ΔTout increases.

Therefore, the anomaly determination can be made based on the fact that the deviation between the first change amount ΔTin and the second change amount ΔTout is less than or equal to the threshold.

Further, as the deviation between the temperature of the gas conducted into the exhaust purification device and the temperature of the exhaust purification device increases, heat exchange between the gas and the exhaust purification device is more likely to be performed. Therefore, in a state in which the exhaust purification device is attached, the larger the deviation between the temperature of the gas conducted into the exhaust purification device and the temperature of the exhaust purification device, the larger the deviation between the first change amount ΔTin and the second change amount ΔTout becomes.

During the fuel cutoff operation, air that has passed through the combustion chamber 20 is conducted into the exhaust purification device. This air has a lower temperature than the exhaust gas. Therefore, the deviation between the temperature of the air conducted into the exhaust purification device and the temperature of the exhaust purification device during the fuel cutoff operation is greater than the deviation between the exhaust gas and the temperature of the exhaust purification device.

The engine control unit 110 executes the anomaly diagnosing process on condition that the fuel cutoff operation is being executed (S42: YES). Then, in the determination process, the engine control unit 110 determines that the deviation between the first change amount ΔTin when the fuel cutoff operation is executed and the second change amount ΔTout when the fuel cutoff operation is executed is less than or equal to the threshold. When it is determined that the deviation is less than or equal to the threshold, the anomaly determination is made (S62: YES, S66).

That is, the engine control unit 110 executes the determination process in a state in which the deviation between the first change amount ΔTin and the second change amount ΔTout differs greatly when comparing the case in which the exhaust purification device is attached and the case in which the exhaust purification device is detached.

During the fuel-cut operation, air having a temperature lower than that of the exhaust gas and lower than that of the exhaust purification device is conducted into the exhaust purification device. During the fuel cutoff operation, the temperature of the air conducted into the exhaust purification device, i.e., the upstream-side temperature Tin, gradually decreases. The air conducted into the exhaust purification device during the fuel cutoff operation is warmed by heat exchange with the exhaust purification device. Accordingly, during the fuel cutoff operation, the downstream-side temperature Tout decreases more gradually than the upstream-side temperature Tin. Thus, the second change amount ΔTout during the fuel cutoff operation becomes a negative value whose absolute value is smaller than that of the first change amount ΔTin. Therefore, if the exhaust purification device is attached, the determination parameter Xd, which is the average value of the difference obtained by subtracting the first change amount ΔTin from the second change amount ΔTout in the determination period, becomes a positive value.

When the exhaust purification device is detached, heat exchange is not performed between air and the exhaust purification device. Accordingly, the second change amount ΔTout also becomes a negative value having a large absolute value. Therefore, the determination parameter Xd becomes a negative value or a positive value smaller than that in the case in which the exhaust purification device is attached.

Accordingly, an anomaly diagnosis can be made based on the determination parameter Xd being less than or equal to the specified value Xth.

However, if the upstream-side temperature Tin increases for some reason within the determination period, the first change amount ΔTin becomes a positive value. In this case, the difference obtained by subtracting the first change amount ΔTin from the second change amount ΔTout is a large negative value. Therefore, the determination parameter Xd becomes small.

Further, when the upstream-side temperature Tin increases, the determination period becomes longer. The first change amount ΔTin and the second change amount ΔTout gradually decrease. Therefore, as the determination period becomes longer, the determination parameter Xd becomes smaller.

In this manner, if the upstream-side temperature Tin increases within the determination period, the anomaly determination is likely to be made even if the exhaust purification device is attached.

In this regard, when determining that the upstream-side temperature Tin has increased within the determination period, the engine control unit 110 determines that the stop condition has been met (S54: YES) and interrupts the determination process. As a result, the anomaly diagnosing process is ended without making the anomaly determination.

After the regeneration process is performed, the temperature of the exhaust purification device is high. In addition, the oxidation reaction of the particulate matter may be continuing. If the determination process is executed in such a state, the second change amount ΔTout becomes unstable, and there is a possibility that an accurate anomaly determination cannot be made.

After executing the regeneration process, as described with reference to FIG. 5, the engine control unit 110 does not execute the determination process during the period from the end of the regeneration process to when the post-regeneration execution condition is met. That is, the engine control unit 110 does not execute the determination process and does not make the anomaly determination in the period immediately after the end of the regeneration process, during which the determination is likely to be affected by the regeneration process.

Advantages of Present Embodiment (1) The engine control unit 110 executes the anomaly diagnosing process on condition that the fuel cutoff operation is being executed. Thus, the determination process is executed in a state in which the deviation between the first change amount ΔTin and the second change amount ΔTout differs greatly when comparing the case in which the exhaust purification device is attached and the case in which the exhaust purification device is detached. This allows the engine control unit 110 make an anomaly determination with higher accuracy.

(2) The determination execution condition includes Condition (9): a condition that the upstream-side temperature Tin exhibits an increasing tendency and the front-side temperature TFr is higher than or equal to the rear-side temperature TRr. That is, the engine control unit 110 starts the determination process on condition that the upstream-side temperature Tin exhibits an increasing tendency.

The air conducted into the exhaust purification device during the fuel cutoff operation is warmed by heat exchange with the exhaust purification device.

When the upstream-side temperature Tin is increasing, the exhaust purification device is warmed by the exhaust gas conducted into the exhaust purification device from the front end. Therefore, the exhaust purification device is highly likely to have a temperature gradient in which the temperature increases toward the front end and decreases toward the rear end.

When the exhaust purification device has such a temperature gradient, in which the temperature decreases toward the rear end, the air conducted into the exhaust purification device is less likely to be warmed than when the exhaust purification device has a temperature gradient in which the temperature increases toward the rear end or when the exhaust purification device has no temperature gradient. That is, when the exhaust purification device has a temperature gradient in which the temperature decreases toward the rear end, the downstream-side temperature Tout is lower than when the exhaust purification device has a temperature gradient in which the temperature increases toward the rear end or when the exhaust purification device has no temperature gradient. Therefore, the second change amount ΔTout is relatively small. On the other hand, during the fuel cutoff operation, the upstream-side temperature Tin gradually decreases toward the atmospheric temperature. Therefore, the first change amount ΔTin during the fuel cutoff operation is large.

As described above, when the exhaust purification device is detached, heat exchange between the gas and the exhaust purification device is not performed. Therefore, the deviation between the first change amount ΔTin and the second change amount ΔTout is relatively small.

That is, the engine control unit 110 starts the determination process in a state in which the deviation between the first change amount ΔTin and the second change amount ΔTout is likely to increase when the exhaust purification device is attached. Thus, the engine control unit 110 executes the determination process in a state in which the deviation between the first change amount ΔTin and the second change amount ΔTout differs greatly when comparing the case in which the exhaust purification device is attached and the case in which the exhaust purification device is detached. This allows the engine control unit 110 make an anomaly determination with higher accuracy.

(3) As described above, the determination execution condition includes Condition (9): a condition that the upstream-side temperature Tin exhibits an increasing tendency and the front-side temperature TFr is higher than or equal to the rear-side temperature TRr. That is, the engine control unit 110 starts the determination process on condition that the front-side temperature TFr is higher than or equal to the rear-side temperature TRr.

In this case also, the engine control unit 110 starts the determination process in a state in which the deviation between the first change amount ΔTin and the second change amount ΔTout is likely to increase when the exhaust purification device is attached. This allows the engine control unit 110 make an anomaly determination with high accuracy.

(4) As described above, the determination execution condition includes Condition (10): a condition that the air-fuel ratio detected by the air-fuel ratio sensor 81 is within a specified range indicating that the engine 10 has been operated at the stoichiometric air-fuel ratio. That is, the engine control unit 110 starts the determination process on condition that the air-fuel ratio detected by the air-fuel ratio sensor 81 is within a specified range.

If a fuel component is contained in the gas conducted into the exhaust purification device, the fuel component may cause an oxidation reaction in the exhaust purification device, and the downstream-side temperature Tout may change due to the heat of reaction. If the downstream-side temperature Tout fluctuates due to such factors, it is not possible to make an accurate anomaly determination.

Therefore, the engine control unit 110 does not execute the determination process when the air-fuel ratio detected by the air-fuel ratio sensor 81 is out of the specified range.

As a result, the engine control unit 110 is prevented from executing the determination process when there is a possibility that an accurate anomaly determination cannot be made.

(5) As described above, if the upstream-side temperature Tin increases within the determination period, an anomaly determination is likely to be made even if the exhaust purification device is attached.

In this regard, when the upstream-side temperature Tin increases within the determination period, the engine control unit 110 interrupts the determination process. This prevents the engine control unit 110 from making an erroneous anomaly determination.

(6) As described above, the determination execution condition includes Condition (11): a condition that it has been determined that there is no influence of the regeneration process. That is, after executing the regeneration process, the engine control unit 110 does not execute the determination process during the period from the end of the regeneration process to when the post-regeneration execution condition is met. The engine control unit 110 does not execute the determination process during the period immediately after the end of the regeneration process, in which the determination process is likely to be affected by the regeneration process. Thus, the engine control unit 110 does not make an anomaly determination in a period immediately after the end of the regeneration process. This prevents the engine control unit 110 from performing an erroneous anomaly diagnosis.

(7) If the engine operation is continued for a certain amount of time after the end of the regeneration process, the temperatures of the exhaust purification device and the exhaust passage 30 converge to a temperature close to the exhaust gas temperature. Further, the oxidation reaction of particulate matter in the exhaust purification device also subsides. In this case, the regeneration process no longer affects the determination process.

Therefore, as described above, the engine control unit 110 determines that the post-regeneration execution condition is met when the engine operation in a state in which the intake air amount Ga is greater than or equal to the specified amount Gath (S76: YES) has continued for a specified period of time or longer (S80: YES) after the end of the regeneration process. This configuration allows the engine control unit 110 to start the determination process when the influence of the regeneration process no longer affects the determination process.

Modifications

The above-described embodiment may be modified as follows. The above-described embodiment and the following modifications can be combined if the combined modifications remain technically consistent with each other.

In the above-described embodiment, an average value calculated by dividing the cumulative sum EDif by the number of times the difference Dif is calculated is used as the determination parameter Xd. However, a value calculated by another method may be used as the determination parameter Xd. The determination parameter Xd may be any value serving as an index value indicating the deviation between the first amount of change ΔTin and the second amount of change ΔTout. For example, the determination parameter Xd may be the cumulative sum EDif itself.

Although, in the above-described embodiment, the determination execution condition includes a condition that the upstream-side temperature Tin exhibits an increasing tendency, the determination execution condition is not limited to this. For example, the fact that the upstream-side temperature Tin exhibits an increasing tendency does not necessarily need to be used as the determination execution condition.

The condition for determining that the upstream-side temperature Tin exhibits an increasing tendency is not limited to the use of the long-term moving average value and the short-term moving average value. For example, only one type of moving average value may be used instead of two types of moving average values, and it may be determined that there is an increasing tendency based on the fact that the differential value of the moving average value is positive.

Although the above-described embodiment compares the front-side temperature TFr and the rear-side temperature TRr, and uses the fact that the front-side temperature TFr is higher than the rear-side temperature TRr as one of the determination execution conditions, this condition may be omitted.

The above-described embodiment uses, as one of the determination execution conditions, the logical conjunction of the upstream-side temperature Tin exhibiting an increasing tendency and the front-side temperature TFr being higher than the rear-side temperature TRr. However, the determination execution conditions may include one of the upstream-side temperature Tin exhibiting an increasing tendency and the front-side temperature TFr being higher than the rear-side temperature TRr.

The above-described embodiment includes, as one of the determination execution conditions, Condition (10): a condition that the air-fuel ratio detected by the air-fuel ratio sensor 81 is within a specified range indicating that the engine 10 has been operated at the stoichiometric air-fuel ratio. The determination execution conditions can be changed. For example, Condition (10) may be omitted.

Although the determination process is interrupted when the upstream-side temperature Tin increases during the determination period, such a stop condition may be omitted.

The above-described embodiment interrupts the determination process when it is determined that the upstream-side temperature Tin is increasing based on the fact that the first change amount ΔTin calculated within the determination period is not a negative value. However, the present disclosure is not limited thereto. For example, when the first change amount ΔTin becomes a positive value, it may be determined that the upstream-side temperature Tin is increasing.

After the regeneration process is executed, the determination process is not executed until the post-regeneration execution condition is met, but this process may be omitted.

The above-described embodiment determines that the post-regeneration execution condition is met when the engine operation in a state in which the intake air amount Ga is greater than or equal to the specified amount Gath has continued for the specified period of time or longer after the end of the regeneration process. However, the present disclosure is not limited thereto. For example, it may be determined that the post-regeneration execution condition is met when a certain period of time has elapsed since the end of the regeneration process.

The specific condition for allowing the regeneration process to be executed is not limited to that described in the above-described embodiment. For example, only one or two of the three conditions (1) to (3) may be used. The specific condition may include a condition other than the above-described three conditions. Alternatively, the specific condition may include none of the three conditions.

A process of estimating the accumulated amount DPM is not limited to that illustrated in FIG. 2. The accumulated amount DPM may be estimated based on the intake air amount Ga and the pressure difference between the upstream side and the downstream side of the GPF 34. Specifically, the accumulated amount DPM may be estimated to be larger when the pressure difference is relatively large than when the pressure difference is relatively small. Further, even if the pressure difference is the same, the accumulated amount DPM may be estimated to be larger when the intake air amount Ga is relatively small than when the intake air amount Ga is relatively large. In a case in which the pressure on the downstream side of the GPF 34 is regarded to be constant, the above-described pressure Pex can be used in place of the pressure difference.

The layout of the three-way catalyst 32 and the GPF 34 in the exhaust passage 30 may be a layout in which the GPF 34 is disposed on the upstream side of the three-way catalyst 32.

The GPF 34 is not limited to a filter supporting a three-way catalyst, but may be a simple filter. The GPF 34 does not necessarily need to be placed on the downstream side of the three-way catalyst 32 in the exhaust passage 30. Also, the vehicle does not necessarily need to include the GPF 34. For example, even in a case in which the exhaust purification device includes only the three-way catalyst 32, the stopping process may be executed in order to warm up the three-way catalyst 32 as described above. The engine control unit 110 may be of any type if it executes the anomaly diagnosing process in order to determine whether the exhaust purification device is in a detached state.

The vehicle does not necessarily execute the torque compensation process of S24.

The regeneration process of S22, that is, the stopping process, does not necessarily make the air-fuel ratio in the cylinders other than the stopped cylinder richer. For example, in the case of the regeneration process of the GPF 34, when the GPF temperature is sufficiently high so that the combustion of the particulate matter occurs if oxygen is supplied, it is possible to continue the combustion of particulate matter and advance the regeneration of the GPF 34 without making the air-fuel ratio richer.

The engine control unit 110 is not limited to a device that includes processing circuitry and a memory, and executes software processing using the processing circuitry and the memory. For example, the engine control unit 110 may include a dedicated hardware circuit such as an application-specific integrated circuit (ASIC)) that executes at least part of the processes executed by the software in the above-described embodiment. That is, the engine control unit 110 may be processing circuitry that includes any one of the following configurations (a) to (c).
- (a) Processing circuitry including a processor that executes all of the above-described processes according to programs and a program storage device such as a ROM that stores the programs.
- (b) Processing circuitry including a processor and a program storage device that execute part of the above-described processes according to the programs and a dedicated hardware circuit that executes the remaining processes.
- (c) Processing circuitry including a dedicated hardware circuit that executes all of the above-described processes.

Multiple software processing devices each including a processor and a program storage device and multiple dedicated hardware circuits may be provided.

The vehicle is not limited to a series-parallel hybrid vehicle, but may be a parallel hybrid vehicle or a series hybrid vehicle. Further, the vehicle is not limited to a hybrid electric vehicle, but may be a vehicle that includes only the engine 10 as a drive force generator.

In the above-described embodiment, the engine 10 is an in-line four-cylinder engine, which includes four cylinders. However, the engine 10 controlled by the engine control unit 110 is not limited thereto. That is, the engine 10 is not limited to a four-cylinder engine. Further, the engine 10 may be a V engine, a horizontally opposed engine, or a W engine, in which an exhaust purification device is provided for each bank. In this case, the stopping process may be configured such that fuel supply to at least one cylinder in each of the banks is stopped during one cycle. This permits a sufficient amount of oxygen to be supplied to the exhaust purification device of each bank of a V engine or the like.

It should be noted that the expression "at least one" as used herein means "one or more" of the desired options. As an example, the expression "at least one" as used herein means "only one option" or "both of two options" if the number of options is two. As another example, the expression "at least one" used herein means "only one option" or "a combination of any two or more options" if the number of options is three or more.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A controller for an internal combustion engine, wherein an exhaust purification device is disposed in an exhaust passage of the internal combustion engine,
   the internal combustion engine is configured to execute a fuel cutoff operation in which an engine output shaft is rotated with fuel supply stopped,
   the controller comprises processing circuitry,
   the processing circuitry is configured to execute a first change amount calculating process, a second change amount calculating process, a determination process, and an anomaly diagnosing process,
   the first change amount calculating process is a process of calculating a first change amount that is a change amount per unit time of an upstream-side temperature, the upstream-side temperature being a temperature of exhaust gas on an upstream side of the exhaust purification device,
   the second change amount calculating process is a process of calculating a second change amount that is a change amount per unit time of a downstream-side temperature, the downstream-side temperature being a temperature of exhaust gas on a downstream side of the exhaust purification device,
   the determination process is a process of determining that a deviation between the first change amount during the fuel cutoff operation and the second change amount during the fuel cutoff operation is less than or equal to a threshold, and
   the anomaly diagnosing process is a process of determining that the exhaust purification device is in a detached state when it is determined in the determination process that the deviation is less than or equal to the threshold.

2. The controller for the internal combustion engine according to claim 1, wherein
   the determination process includes determining that the deviation between the first change amount during the fuel cutoff operation and the second change amount during the fuel cutoff operation is less than or equal to the threshold, based on an average value of a deviation obtained by subtracting the first change amount from the second change amount in a determination period being less than or equal to a specified value, and
   the determination period is a period from when the determination process is started to when the upstream-side temperature decreases by a specified temperature from a value at the start of the determination process.

3. The controller for the internal combustion engine according to claim 1, wherein the processing circuitry is configured to start the determination process on condition that the upstream-side temperature exhibits an increasing tendency.

4. The controller for the internal combustion engine according to claim 3, wherein
   the processing circuitry is configured to execute a first average value calculating process and a second average value calculating process, the first average value calculating process is a process of calculating a short-term moving average value of the upstream-side temperature, the second average value calculating process is a process of calculating a long-term moving average value, the long-term moving average value being a moving average value of the upstream-side temperature in a period longer than a period in which the short-term moving average value is calculated, and the processing circuitry is configured to determine that the upstream-side temperature exhibits an increasing tendency based on a differential value of the short-term moving average value and a differential value of the long-term moving average value both being greater than or equal to a specified value.

5. The controller for the internal combustion engine according to claim 1, wherein the processing circuitry is configured to execute a front-end temperature estimating process and a rear-end temperature estimating process, the front-end temperature estimating process is a process of estimating a front-side temperature, the front-side temperature being a temperature of a section of the exhaust purification device between a center and a front end, the rear-end temperature estimating process is a process of estimating a rear-side temperature, the rear-side temperature being a temperature of a section of the exhaust purification device between the center and a rear end, and the processing circuitry is configured to start the determination process on condition that the front-end temperature is higher than or equal to the rear-end temperature.

6. The controller for the internal combustion engine according to claim 1, wherein the processing circuitry is configured to start the determination process on condition that an air-fuel ratio detected by a sensor disposed upstream of the exhaust purification device in the exhaust passage is within a specified range.

7. A control method for an internal combustion engine, wherein an exhaust purification device is disposed in an exhaust passage of the internal combustion engine, the internal combustion engine is configured to execute a fuel cutoff operation in which an engine output shaft is rotated with fuel supply stopped, the control method comprises:

calculating a first change amount that is a change amount per unit time of an upstream-side temperature, the upstream-side temperature being a temperature of exhaust gas on an upstream side of the exhaust purification device;

calculating a second change amount that is a change amount per unit time of a downstream-side temperature, the downstream-side temperature being a temperature of exhaust gas on a downstream side of the exhaust purification device;

determining that a deviation between the first change amount during the fuel cutoff operation and the second change amount during the fuel cutoff operation is less than or equal to a threshold; and determining that the exhaust purification device is in a detached state when it is determined that the deviation is less than or equal to the threshold.

\* \* \* \* \*